United States Patent [19]

Stramel

[11] Patent Number: 5,318,625
[45] Date of Patent: Jun. 7, 1994

[54] PIGMENTS FOR IMPROVED DISPERSIBILITY IN THERMOPLASTIC RESINS

[75] Inventor: Rodney D. Stramel, Edmond, Okla.

[73] Assignee: Kerr-McGee Chemical Corporation, Oklahoma City, Okla.

[21] Appl. No.: 963,042

[22] Filed: Oct. 19, 1992

Related U.S. Application Data

[63] Continuation of Ser. No. 854,768, Mar. 20, 1992, abandoned, which is a continuation of Ser. No. 646,970, Jan. 25, 1991, abandoned.

[51] Int. Cl.$^5$ ................................................ C08K 5/00
[52] U.S. Cl. .................................... 106/447; 106/499; 106/287.29; 106/18.18; 106/18.31; 106/503
[58] Field of Search ............ 106/18.18, 18.31, 287.29, 106/499, 503, 447

[56] References Cited

U.S. PATENT DOCUMENTS

| | | | |
|---|---|---|---|
| 3,076,719 | 2/1963 | Whately et al. | 106/447 |
| 3,341,343 | 9/1967 | Beiswanger et al. | 106/177 |
| 3,380,927 | 4/1968 | Edelstein et al. | 252/308 |
| 3,531,310 | 9/1970 | Goodspeed et al. | 106/436 |
| 4,183,843 | 1/1980 | Koenig et al. | 523/216 |
| 4,209,430 | 6/1980 | Weber | 524/497 |
| 4,350,535 | 9/1982 | Ishijima et al. | 106/404 |
| 4,357,170 | 11/1982 | Brand | 106/448 |
| 4,377,417 | 3/1983 | Brand | 106/448 |
| 4,720,514 | 1/1988 | Needham | 524/140 |
| 4,752,340 | 6/1988 | Brand et al. | 106/448 |
| 4,986,851 | 1/1991 | Dietz et al. | 106/503 |

*Primary Examiner*—Karl Group
*Assistant Examiner*—Scott L. Hertz
*Attorney, Agent, or Firm*—Herbert M. Hanegan

[57] ABSTRACT

A pigment composition of improved dispersibility in thermoplastic resins and concentrates of the pigment composition in thermoplastic resin are provided. The pigment composition is comprised of an inorganic pigment such as titanium dioxide having an organophosphate ester treating agent deposited thereon.

36 Claims, No Drawings

PIGMENTS FOR IMPROVED DISPERSIBILITY IN THERMOPLASTIC RESINS

This application is a continuation of application Ser. No. 07/854,768 filed Mar. 20, 1992, abandoned, which is a continuation of application Ser. No. 07/646,970, filed Jan. 25, 1991, abandoned.

BACKGROUND OF THE INVENTION

1. Field of the Invention

The present invention relates to compositions of matter characterized by their improved dispersibility in thermoplastic resins. More particularly, the present invention relates to chemically treated inorganic pigments suitable for use in thermoplastic resins. Most particularly, the present invention relates to titanium dioxide pigments treated with an organophosphate ester treating agent.

2. Description of the Prior Art

The use of inorganic pigments such as, for example, pigmentary titanium dioxide, as UV light stabilizers, colorants, opacifiers and the like in various thermoplastic resins is known. It also is known, however, that due to the hydrophilic nature of such inorganic pigments and to the hydrophobic nature of the thermoplastic resins, the compatibility and thus the dispersibility of such pigments in such resins, particularly at high pigment loadings, leaves much to be desired.

It further is known that the compatibility and thus the dispersibility of inorganic pigments in thermoplastic resins can be significantly improved through chemical surface treatment of the pigments. For example, in U.S. Pat. No. 4,209,430 it is disclosed to treat inorganic pigments such as titanium dioxide pigment with phosphorylated polyenes, i.e., aliphatic polyunsaturated compounds of at least ten carbon atoms to which a phosphoryl group has been added to the olefinic unsaturation thereof. The pigments thus treated are described as not only possessing improved pigment properties but also improved uniformity of dispersion and a reduced tendency to yellow in those thermoplastic polyolefins to which the treated pigments may be added.

Further examples of methods or treatments for reducing the tendency of inorganic pigments, and particularly titanium dioxide, to yellow in various polymeric compositions are those disclosed in U.S. Pat. Nos. 4,357,170 and 4,377,417. According to these patents, the application to pigmentary titanium dioxide of an additive system comprised of either the combination of an organophosphate/alkanolamine addition product and a polyol or the organophosphate/alkanolamine addition product alone results in a reduction of the tendency of titanium dioxide pigment to yellow in polymeric compositions. The organophosphate materials utilized to produce the addition product include those organophosphate materials disclosed in U.S. Patent No. 3,380,927. These materials comprise orthophosphate or polyphosphate coesters of, conjointly, an aliphatic alcohol containing 6 to 16 carbon atoms and a nonionic adduct of ethylene oxide and a reactive hydrogen containing organic compound. The organic compounds employed to form the adduct include alkylated phenols, aliphatic alcohols containing 6 to 25 carbon atoms, aliphatic monocarboxylic acids and the like. Neither U.S. Pat. No. 4,357,170 nor U.S. Pat. No. 4,377,417 mentions any benefit to be afforded by such treatment relevant to the dispersibility of the thus treated pigment when employed in a polymeric composition.

A still further example of the treatment of inorganic fillers or pigments with organophosphate esters is found in U.S. Pat. No. 4,183,843. This patent teaches the surface treatment of inorganic fillers or pigments, including titanium dioxide, with polar phosphate ester surfactants containing both acid and polar ether groups. The thus treated fillers or pigments, when combined with a sprayable, curable polyester resin results in filler or pigment/polyester dispersions of reduced viscosities. Although the exact nature or structure of the treating materials is not definitively identified, materials such as Triton QS-44, a product of Rohm and Haas, listed as an exemplary coating material is known to comprise the composition, octylphenoxyethoxyethylphosphate.

None of the foregoing patents suggest either the treated inorganic pigments or the polymeric concentrates produced therefrom which are the subject of this application.

SUMMARY OF THE INVENTION

In accordance with the present invention, there are provided inorganic pigments characterized by possessing an improved dispersibility in thermoplastic resins. The improved inorganic pigments, preferably titanium dioxide pigments, have deposited thereon at least one organophosphate ester treating agent corresponding to the general formula $[RO(R'O)_x]_3PO$. In this formula, R represents a monovalent lower alkyl radical containing from about 1 to about 6 carbon atoms, R' is a divalent hydrocarbon radical selected from the group consisting of ethylene and propylene radicals and x is a number ranging from about 1 to about 15.

The present invention further relates to pigmented polymeric concentrates comprising as a continuous phase a thermoplastic resin and as a disperse phase the above described organophosphate ester treated inorganic pigments.

DETAILED DESCRIPTION OF THE INVENTION

The inorganic pigments which can be subjected to treatment with the hereinafter described organophosphate ester treating agents to provide the improved inorganic pigments of the present invention include any of the white or colored, opacifying or nonopacifying particulate inorganic pigments (or mineral pigments) known and employed in the surface coatings (e.g., paint) and plastics industries. For purposes of this present description, the term inorganic pigments is employed broadly to define materials which are particulate by nature and nonvolatile in use and typically are most usually referred to as inerts, fillers, extenders, reinforcing pigments and the like.

Representative but non-limiting examples of inorganic pigments which can be treated as herein described to provide the improved inorganic pigments of this invention include white opacifying pigments such as titanium dioxide, basic carbonate white lead, basic sulfate white lead, basic silicate white lead, zinc sulfide, zinc oxide, lithophone (a composite pigment of zinc sulfide and barium sulfate), antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide and the like. Of all the inorganic pigments useful in producing the improved inorganic pigments of the present invention, a most preferred pigment is that of pigmentary titanium dioxide.

In general, the preferred titanium dioxide pigment for use in preparing an improved pigment of this invention can be of either the anatase or rutile crystalline structure or combination thereof. This pigment may be produced by way of various known commercial processes which are familiar to those of skill in this art but which processes do not form any part of the present invention. Thus, this particular pigment can be one produced by either the well known sulfate process or the well known vapor phase oxidation process. The former process, i.e., the sulfate process, typically involves the steps of leaching a titaniferous ore with sulfuric acid to produce a titanium sulfate solution, hydrolysis of the titanium sulfate to form a titanium dioxide precipitate and calcination of this precipitate in the presence of suitable additives to develop the desired crystalline structure in the final calcined titanium dioxide product. In the latter process, i.e., the vapor phase oxidation process, a titanium halide such as titanium tetrachloride is oxidized in the vapor phase at elevated temperatures to produce what is commonly referred to as raw titanium dioxide. This raw pyrogenic titanium dioxide product then is recovered, subjected to milling and classification operations and, following treatment to deposit various hydrous metal oxide coatings upon the pigment, subjected to a final milling step to provide a pigment of the desired particle size.

Typically, the final milling step will comprise the use of fluid energy milling techniques. These techniques involve conveying the pigment through a milling apparatus such as the fluid energy mills disclosed in U.S. Pat. Nos. 2,032,827 and 2,219,011 using one or more gaseous streams produced by jets of a milling fluid such as air or steam to effect collision between individual pigment particles and thus a reduction in size of such particles. Various additive materials may be incorporated into the pigment during the fluid energy milling either to improve the milling of the pigment as disclosed in U.S. Pat. No. 3,531,310 or to enhance particular chemical, physical and optical properties of the resultant milled pigment as disclosed in U.S. Pat. No. 4,752,340. Representative, but non-limiting, examples of such additive materials include polyols such as glycerol, pentaerythritol trimethylolethane, trimethylolpropane and the like, fatty acids such as oleic acid, stearic acid and the like, trialkanolamines such as triethanolamine and the like and amine salts such as triethanolamine melonate triisopropaolomine succinate and the like.

The amounts of the above disclosed additive materials which can be employed may vary broadly. Such broad variance depends upon both the particular additive material employed and the particular purpose for which it is added. Thus, for example, additive materials employed as aids to the milling of the titanium dioxide pigment will be utilized in amounts ranging from about 0.05 to about 5.0 weight percent based on the weight of the pigment. The amounts of the additive materials employed to modify any one or more of the chemical, physical or optical properties of the pigment typically will range from about 0.01 to about 3.0 weight percent based on the weight of the pigment.

Like the additive materials disclosed above, the organophosphate ester treating agents employed to provide the improved titanium dioxide pigment and the other inorganic pigments of this invention also can be readily deposited onto this pigment during the fluid energy milling thereof. However, other convenient methods for treating the titanium dioxide and the other inorganic pigments disclosed herein with the organophosphate ester treating agent can be used. Such other methods include, for example, applying the treating agent to the pigments by spraying or otherwise mixing the treating agent with the dry pigments. Thus the treating agent can be applied to the pigments by addition of the treating agent to the pigments through the intensifier bar of a V-blender or by spraying the treating agent into a screw conveyor or paddle mixer containing the pigments.

As disclosed hereinabove, the organophosphate ester treating agents useful in providing the inorganic pigments of improved thermoplastic resin dispersibility include those compounds corresponding to the general formula, $[RO(R'O)_x]_3PO$. In this formula, R is defined as being a monovalent alkyl radical containing from 1 to 6 carbon atoms, preferably from 2 to 4 carbon atoms and most preferably 4 carbon atoms, R' is defined as being a divalent hydrocarbon radical selected from the group consisting of ethylene and propylene radicals, preferably an ethylene radical and x is defined as a number ranging from about 1 to about 15, preferably from about 1 to about 5 and most preferably 1. The monovalent alkyl radical, R, in this formula, can be either a straight-chain or branched-chain alkyl radical. Representative examples of such radicals include methyl, ethyl, n-propyl, isobutyl, n-pentyl, isopentyl, n-hexyl radicals and the like. Non-limiting examples of organophosphate ester treating agents useful in preparing the improved inorganic pigments of the present invention include tri(methoxyethyl) phosphate, tri(butoxyethyl) phosphate, tri(isobutoxyethyl) phosphate, tri(hexoxyethyl) phosphate, tri(ethoxypolyethoxyethyl) phosphate, tri(ethoxypolypropoxypropyl) phosphate, and the like.

The amount of organophosphate esters (or triesters) employed to treat the inorganic pigments described hereinabove, and particularly titanium dioxide pigment, will be an amount sufficient to provide a treated pigment exhibiting a dispersibility in thermoplastic resins greater than that of the pigment prior to treatment. Broadly, the amount of the organophosphate ester (or triester) treating agent employed will be an amount ranging from about 0.1 to about 5 weight percent based upon the weight of the pigment, preferably an amount ranging from about 0.3 to about 1.2 weight percent.

The resulting organophosphate ester treated inorganic pigments can be employed to readily and uniformly pigment a wide variety of thermoplastic resins. These include such well known classes of thermoplastic resins as polyolefin resins, acrylic resins, polyester resins, polyamide resins, epoxy resins, phenolic resins, poly(vinylaromatic) resins, poly(vinylhalide) resins, polycarbonate resins, polyurethane resins, and the like. Representative, but non-limiting, examples of these various classes of thermoplastic resins include: polyolefin resins such as polyethylene, polypropy-lene, and the like; acrylic resins such as poly(acrylic acid), poly(methacrylic acid), poly(methylacrylate), poly(methylmethacrylate), and the like; polyester resins such as poly(ethylene terephthalate), oly(butylene terephthalate) and the like; polyamide resins such as nylon-6 and nylon-6,6, and the like; epoxy resins such as poly(epichlorohydrin/bisphenol A) and the like and esters thereof such as those prepared by the esterification of poly(epichlorohydrin/bisphenol A) with a fatty acid, resin acid, tall oil acid or mixtures thereof; phenolic resins such as those derived from the reaction of formaldehyde with phenol, resorcinol, cresol, p-phenylphenol, and the like; poly(vinylaromatic) resins such as polystyrene and copoly-mers thereof such as poly(styrene-acrylonitrile), poly(styrene-butadiene-acrylonitrile), and the like; poly(vinylhalide) resins, such as poly(vinylchloride), poly(vinylchloride/vinylidene chloride) and the like; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with diphenyl carbonate to produce bisphenol A polycarbonate; and polyurethane resins obtained by the reaction of di- or polyfunctional hydroxy compounds such as glycols or hydroxyl terminated polyesters and polyethers with di- or polyfunctional diisocyanates.

The amounts of the organophosphate ester treated inor-ganic pigments of this invention which can be added directly to the above described thermoplastic resins can vary widely depending upon the intended end use for these resins. Thus, thin films sometimes will require very high pigment levels while thick parts may only require a very small percentage. Accordingly, the amount of the treated pigment employed can range from as little as about 1 weight percent to as much as about 80 weight percent based upon the weight of the thermo-plastic resin.

In yet a further embodiment of the present invention, the organophosphate ester treated inorganic pigments of the present invention have exhibited particular utility in the preparation of dispersed pigment concentrates. Broadly, these dispersed pigment concentrates will comprise a continuous phase constituting a thermoplastic resin and a disperse phase constituting the organophosphate ester treated inorganic pigments of this invention. The continuous phase may comprise any of the thermoplastic resins hereinbefore described, including the polyolefin resins, acrylic resins, polyester resins, polyamide resins, epoxy resins, phenolic resins, poly(vinylaromatic) resins, poly(vinylhalide) resins, polycarbonate resins, polyurethane resins, and the like.

In preparing the dispersed pigment concentrates of the present invention, the amount of pigment incorporated into the thermoplastic resin continuous phase can vary widely. In general, this amount will vary depending upon the level of pigmentation desired or required in the final or finished end product employing these dispersed pigment concentrates as pigmenting vehicles, and the effectiveness of the proc-essing equipment utilized to reduce, dilute or dissolve the dispersed pigment concentrates in the thermoplastic resins used to produce the final or finished end products. Broadly, the dispersed pigment concentrates of this inven-tion may contain weight ratios of the treated inorganic pig-ment to the thermoplastic resin in which it is dispersed ranging from about 0.5:1 to about 5:1. Within such range, the treated inorganic pigment of the present invention can be easily and uniformly dispersed or distributed throughout the thermoplastic resin employed as the continuous phase of the dispersed pigment concentrate produced.

Processes and process equipment useful in the prepara-tion of the above described dispersed pigment con-centrates are known and do not form any part of this aspect of this invention. Such known processes generally involve mixing and/or blending techniques utilizing equipment capable of handling high plastic viscosity materials. Illustrative of equipment typically employed in mixing and/or blending proc-esses include various kneader type dispersers, such as the Banbury mixer, single and multi-role mills, and the like. A more detailed description of such mixing and/or blending processes and the equipment which may be employed therein can be found in Kirk-Othmer, Encyclopedia of Chemical Technology, 2nd Ed., Vol. 15, pages 592–596.

The invention is further described and illustrated by the following examples. These examples represent specific embodiments of the invention and are not to be construed as limitations thereon.

EXAMPLE 1

A rutile titanium dioxide product of the Kerr-McGee Corporation of Oklahoma City, Oklahoma marketed under the trade designation CR-834 and having a median particle size of about 0.33 microns was treated in accordance with the present invention. That is, the particulate titanium dioxide was dry treated with tri(-butoxyethyl) phosphate as a fine mist or spray at a concentration of about 1% by weight of pigment. Specifically, the titanium dioxide and tri(butoxyethyl) phosphate were mixed in a v-blender in which the tri(butoxyethyl) phosphate was added through the intensifier bar.

The dispersibility of the treated titanium dioxide as compared to untreated titanium dioxide was then determined. That is, the mixing bowl of a Brabender Plasticorder was loaded with 36.50 g of a polystyrene resin marketed by the Dow Chemical Company under the trade designation STYRON ®#615, 0.31 g of zinc stearate as a lubricant and 109.50 g of the above described treated titanium dioxide. The bowl tem-perature was set at 40° C. and the blade speed at 150 rpm. The torque and temperature were then recorded vs time. The procedure was repeated using untreated titanium dioxide in order to compare the dispersibility of the treated titanium dioxide with untreated titanium dioxide. The results of these tests are set forth in Table 1 below.

TABLE 1

| Pigment Tested | Torque, Metergrams | Temperature, °C. |
| --- | --- | --- |
| Untreated | 1616 | 182 |
| Tri(butoxyethyl) Phosphate treated | 1340 | 173 |

The lower torque and temperature of the treated titanium dioxide as compared to untreated titanium dioxide indicates that the treated titanium dioxide has a greater dispersibility than the untreated titanium dioxide.

EXAMPLE 2

The procedure Of Example 1 was repeated except that instead of being compared with untreated titanium dioxide, the dispersibility of treated titanium dioxide of the pre-sent invention is compared with Kerr-McGee Company CR-834 rutile titanium dioxide treated with 1% by weight of pigment of a phosphorylated polyene treating agent of the type disclosed in U.S. Pat. No. 4,209,430 issued Jun. 24, 1980 which is incorporated herein by reference, i.e., Sylvakote K pigment dispersing agent (Sylvacote K is a trademark of Sylvakim Corp.). The results of this comparison are set forth in Table 2 below.

TABLE 2

| Pigment Tested | Torque, Metergrams | Temperature, °C. |
| --- | --- | --- |
| Sylvakote K treated | 1450 | 171 |
| Tri(butoxyethyl) Phosphate treated | 1370 | 166 |

From Table 2 it can be seen that the treated titanium dioxide pigment of the present invention exhibits a lower torque and temperature, and therefore, a greater disper-sibility than the same titanium dioxide pigment treated with a phosphorylated polyolefin treating agent.

EXAMPLE 3

The procedure of Example 1 was repeated except that the sent invention is compared to the same titanium dioxide pigment treated (1% by weight of pigment) with various of the coating materials disclosed in U.S. Pat. No. 4,183,843 issued Jan. 15, 1980 which is incorporated herein by reference. The results of these tests are set forth in Table 3 below.

TABLE 3

| Pigment Tested | Torque, Metergrams | Temperature, °C. |
| --- | --- | --- |
| Triton QS-44 treated | 1455 | 181 |
| Wayfos D-10N treated | 1432 | 179 |
| Wayfos M-60 treated | 1433 | 179 |
| Wayfos M-100 treated | 1411 | 178 |
| Tri(butoxyethyl) Phosphate treated | 1320 | 173 |

The data of Table 3 demonstrates the lower torque and temperature, and therefore, the greater dispersibility of the treated pigment of the present invention as compared with pigment treated with polar phosphate esters.

EXAMPLE 4

The titanium dioxide described in Example 1 was treated (1% by weight of pigment) with tri(butoxyethyl) phosphate in a Jet'O mill manufactured by Fluid Energy Processing and Equipment Company. The dispersibilities of the treated titanium dioxide and untreated titanium dioxide were deter-mined as described in Example 1. The results are set forth in Table 4 below.

TABLE 4

| Pigment Tested | Torque, Metergrams | Temperature, °C. |
| --- | --- | --- |
| Untreated | 1599 | 187 |
| Tri(butoxyethyl) Phosphate treated | 1278 | 173 |

EXAMPLE 5

Samples of treated and untreated titanium dioxide pig-ment (Kerr-McGee Co. CR-834) were tested for dispersibility. A Banbury mixer was charged with 105 pounds of Dow Chemical Company STYRON #615 Polystyrene, 5 pounds of conventional processing aids and 200 pounds of the titanium dioxide sample. The batch temperature during mixing was determined as was the melt flow rate of the mixed material when extruded. The treated and untreated titanium dioxide pigments tested and the results of the tests are set forth in Table 5 below.

TABLE 5

| Pigment Tested | Batch Temp., °F. | Melt Flow Rate, g/10 minutes |
| --- | --- | --- |
| Untreated | 319 | 27.1 |
| Untreated | 325 | 35.7 |
| Sylvacote K treated | 301 | 57.0 |
| Tri(butoxyethyl) Phosphate treated | 294 | 65.6 |

From Table 5 it can be seen that the titanium dioxide treated in accordance with the present invention has the lowest batch mixing temperature and the highest melt flow rate indicating the greatest dispersibility.

Thus, the present invention is well adapted to carry out the objects and obtain the ends and advantages mentioned as well as those inherent therein. While presently prepared embodiments of the invention have been described herein, it is to be understood that modifications and changes can be made in the treated pigments and concentrates of the present invention without departing from the spirit or scope of the invention as set forth in the following claims.

What is claimed is:

1. Dispersed inorganic pigment concentrates comprising a thermoplastic resin and an amount of an inorganic pigment in the range of from 65.57% to about 83.33% by weight based upon the combined weight of the thermoplastic resin and the inorganic pigment, said pigment having deposited thereon an organophosphate ester treating agent corresponding to the general formula $[RO(R'O)_x]_3PO$ wherein R is a monovalent lower alkyl radical containing from 2 to 4 carbon atoms, R' is a divalent hydrocarbon radical selected from the group consisting of ethylene and propylene radicals and x is a number of rom about 1 to about 15, said organophosphate ester treating agent being deposited upon said pigment in am amount of at least about 0.1 percent by weight based upon the weight of said pigment.

2. The dispersed inorganic pigment concentrates of claim 1 wherein said thermoplastic resin is a thermoplastic homo— or copolymer resin.

3. The dispersed inorganic pigment concentrates of claim 2 wherein said thermoplastic resin is a thermoplastic homopolymer resin selected from the group consisting of polyolefin, polyvinyl, polyacrylic, phenolic, alkyl, epoxy, nylon, polyurethane, phenoxy, polycarbonate and polyester resins.

4. The dispersed inorganic pigment concentrates of claim 3 wherein said thermoplastic homopolymer resin comprises polyolefin or polyvinyl resin.

5. The dispersed inorganic pigment concentrates of claim 3 wherein said thermoplastic homopolymer resin is polystyrene.

6. The dispersed inorganic pigment concentrates of claim 1 wherein R in said general formula is a monovalent alkyl radical containing 4 carbon atoms and x is 1.

7. The dispersed inorganic pigment concentrates of claim 1 wherein said inorganic pigment is titanium dioxide pigment.

8. The dispersed inorganic pigment concentrates of claim 1 wherein said amount of said organophosphate ester treating agent deposited upon said pigment ranges from about 0.1 to about 5 percent by weight.

9. The dispersed inorganic pigment concentrates of claim 8 wherein x is a number in the range of from about 1 to about 5.

10. The dispersed inorganic pigment concentrates of claim 9 wherein:
R is a monovalent alkyl radical containing 4 carbon atoms;
R' is ethylene;
x is about 1.

11. The dispersed inorganic pigment concentrates of claim 9 wherein said thermoplastic resin in polystyrene.

12. The dispersed inorganic pigment concentrates of claim 9 wherein said amount of said inorganic pigment is an amount in the range of from about 3 parts to about 5 parts by weight per 1 part by weight of said thermoplastic resin.

13. A process for preparing a thermoplastic composition comprising the steps of:
(a) depositing an organophosphate ester treating agent on an inorganic pigment material and
(b) after step (a), dispersing said pigment material having said treating agent deposited thereon in a thermoplastic resin,
wherein said treating agent is a treating magnet of the formula [RO(R'O)$_x$]$_3$PO wherein R% is a monovalent alkyl radical having from 2 to 4 carbon atoms, R' is a divalent hydrocarbon radical selected from the group consisting of ethylene and propylene radicals, and x is a number in the range of from about 1 to about 15 and
wherein said treating agent is deposited on said pigment material in step (a) in an amount in the range of from about 0.1% to about 5% by weight based on the weight of said pigment material.

14. The process of claim 13 wherein x is a number in the range of from about 1 to about 5.

15. The process of claim 14 wherein:
R is a monovalent alkyl radical having 4 carbon atoms;
R' is ethylene; and
x is about 1.

16. The process of claim 14 wherein said pigment material is titanium dioxide.

17. The process of claim 14 wherein said treating agent is tri(butoxyethyl) phosphate.

18. The process of claim 14 wherein said thermoplastic resin is a poly(vinylaromatic) resin.

19. The process of claim 14 wherein said thermoplastic resin is polystyrene.

20. The process of claim 14 wherein said treating agent is deposited on said pigment material in step (a) in an amount in the range of from about 0.3% to about 1.2% by weight based on the weight of said pigment material.

21. The process of claim 14 wherein the amount of said pigment material dispersed in said thermoplastic resin in step (b) is an amount in the range of from 65.57% to about 83.33% by weight based on the combined weight of said pigment material and said thermoplastic resin.

22. The process of claim 14 wherein said pigment material is dispersed in said thermoplastic resin in step (b) in an amount in the range of from about 3 to about 5 parts by weight per 1 part by weight of said thermoplastic resin.

23. A process for preparing a thermoplastic composition comprising the step of dispersing a pretreated pigment material in a thermoplastic resin, wherein:
said pretreated pigment material comprises an inorganic pigment material which has been treated prior to said step of dispersing by depositing an organophosphate ester treating agent thereon;
said treating agent is a treating magnet of the formula [RO(R'O)$_x$]$_3$PO wherein R is a monovalent alkyl radical having from 2 to 4 carbon atoms, R' is a divalent hydrocarbon radical selected from the group consisting of ethylene and propylene radicals, and x is a number in the range of from about 1 to about 15; and
said pretreated pigment material comprises an amount of said treating agent in the range of from about 0.1% to about 5% by weight based on the weight of said inorganic pigment material.

24. The process of claim 23 wherein x is a number in the range of from about 1 to about 5.

25. The process of claim 24 wherein:
R is a monovalent alkyl radical having 4 carbon atoms;
R' is ethylene; and
x is about 1.

26. The process of claim 24 wherein said inorganic pigment material is titanium dioxide.

27. The process of claim 24 wherein said treating agent is tri(butoxyethyl) phosphate.

28. The process of claim 24 wherein said thermoplastic resin is a poly(vinylaromatic) resin.

29. The process of claim 24 wherein said thermoplastic resin is polystyrene.

30. The process of claim 24 wherein said amount of said treating agent is an amount in the range of from about 0.3% to about 1.2% by weight based on the weight of said inorganic pigment material.

31. The process of claim 24 wherein the amount of said pretreated pigment material dispersed in said thermoplastic resin in said step of dispersing is an amount in the range of from 65.57% to about 83.33% by weight based on the combined weight of said pretreated pigment material and said thermoplastic resin.

32. The process of claim 24 wherein said pretreated pigment material is dispersed in said thermoplastic resin in said step of dispersing in an amount in the range of from about 3 to about 5 parts by weight per 1 part by weight of said thermoplastic resin.

33. The process of claim 24 wherein:
R is a monovalent alkyl radical having 4 carbon atoms;
R' is ethylene;
x is about 1;
said inorganic pigment material is titanium dioxide; and
said amount of said treating agent is an amount in the range of from about 0.3% to about 1.2% by weight based on the weight of said inorganic pigment material.

34. The process of claim 33 wherein said thermoplastic resin is polystyrene.

35. The process of claim 33 wherein the amount of said pretreated pigment material dispersed in said thermoplastic resin in said step of dispersing is an amount in the range of from 65.57% to about 83.33% by weight based on the combined weight of said pretreated pigment material and said thermoplastic resin.

36. The process of claim 33 wherein said pretreated pigment material is dispersed in said thermoplastic resin in said step of dispersing in an amount in the range of from about 3 to about 5 parts by weight per 1 part by weight of said thermoplastic resin.

* * * * *

UNITED STATES PATENT AND TRADEMARK OFFICE
CERTIFICATE OF CORRECTION

PATENT NO. : 5,318,625
DATED : June 7, 1994
INVENTOR(S) : Rodney D. Stramel

It is certified that error appears in the above-indentified patent and that said Letters Patent is hereby corrected as shown below:

Column 8, line 39, delete "rom" and insert --from--

Column 8, line 41, delete "am" and insert --an--

Column 9, line 24, delete "magnet" and insert --agent--

Column 9, line 25, delete "R%" and insert --R--

Column 10, line 5, delete "magnet" and insert --agent--

Signed and Sealed this

Fourteenth Day of October, 1997

Attest:

BRUCE LEHMAN

Attesting Officer

Commissioner of Patents and Trademarks